Dec. 21, 1943.  S. DALY  2,337,232
GAS MASK
Filed May 21, 1941
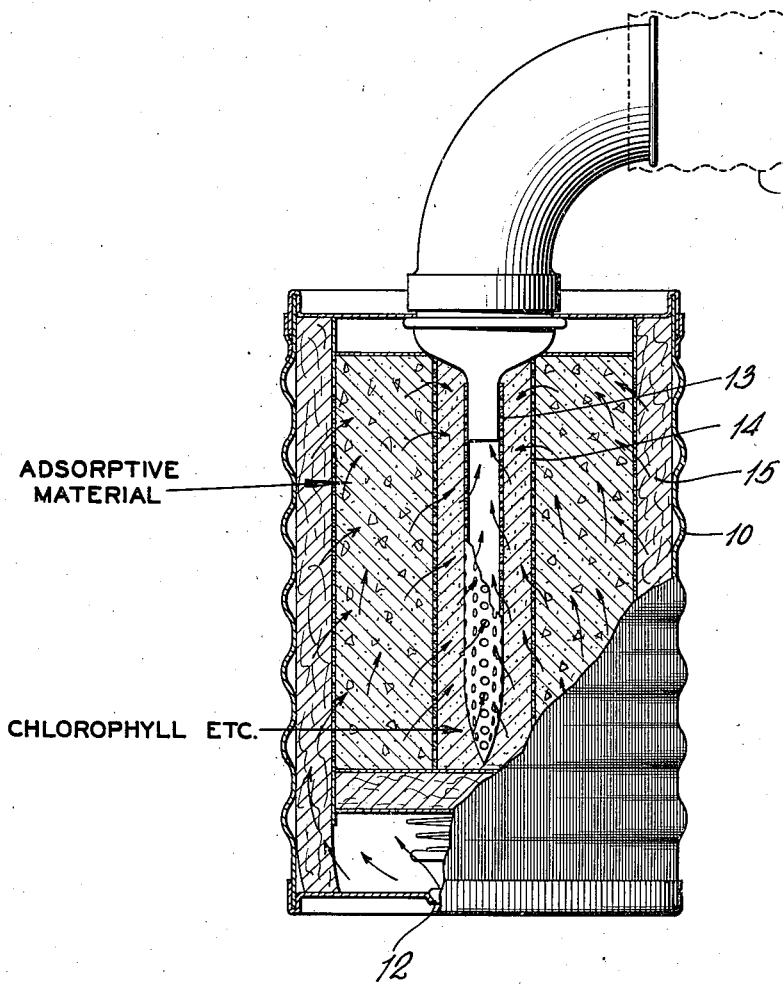
INVENTOR
Sylvester Daly
BY
Kenyon & Kenyon
ATTORNEYS Patented Dec. 21, 1943

2,337,232

UNITED STATES PATENT OFFICE 2,337,232

GAS MASK

Sylvester Daly, Woodcliff Lake, N. J.

Application May 21, 1941, Serial No. 394,458

5 Claims. (Cl. 252—268.3)

This invention relates to gas masks.

The gas mask commonly used in military service consists essentially of a facepiece of rubber or rubberized fabric which fits tightly across the forehead, along the cheeks and under the chin and such facepiece is connected by a short piece of flexible and non-collapsible tube to a sheet metal canister containing adsorbent materials. The facepiece is fitted with windows of nonsplintering glass placed in front of the eyes and the canister is worn suspended from the shoulders or strapped across the chest. The bottom of the canister is provided with a light disk check valve which opens only to admit air and a second check valve opens from the facepiece to the outside air. Thus, the air breathed in by the wearer of the mask must pass through the canister and the air exhaled by the wearer is discharged through the facepiece.

The principle upon which the gas mask functions is the purification of inspired air by removal of poisonous and toxic gases, vapors and irritant smoke. Perfect fit of the facepiece is depended upon to insure that only air which passes through the canister is drawn into the lungs. The canister is an oblong shaped metal box containing a combination gas and smoke filter. The filter consists of an oval-shaped perforated sheet metal chemical container filled with a mixture of 80% activated charcoal and 20% soda lime. The outer surface of the chemical container is covered with a suitable filter material such as thick porous paper or felt which is effective to remove the irritant smoke particles. Inspired air enters the canister through the bottom inlet valve and is first drawn through the smoke filter where solid and liquid particles, if present, are filtered out. The air then passes through the interior of the chemical container into contact with the chemicals therein and the toxic vapors are absorbed by the charcoal or neutralized by the soda lime. The purified air passes out of the canister through the tube previously referred to.

Toxic gases encountered in civilian occupations are mainly the following organic vapors such as aniline, gasoline, benzene, ether, toluene—acids such as hydrochloric, sulfur dioxide, nitrogen peroxide and chlorine—ammonia gas—and carbon monoxide. The principal war gases are as follows: brombenzyl cyanide ($C_6H_5CHBrCN$), chlorpicrin ($CCl_3NO_2$), cyanogen chloride (CNCl), mustard gas (dichlorethyl sulfide $(C_2H_4Cl)_2S$), chlorine $Cl_2$, phosgene ($COCl_2$) hydrocyanic acid (HCN), lewisite (chlorvinyldichlorarsine $CHClCHAsCl_2$), diphenylchlorarsine ($(C_6H_5)_2AsCl$).

The gas mask above described does not afford protection against gases such as ammonia, hydrochloric or hydrocyanic acid fumes and is useless for such gases as carbon monoxide. It is, however, useful in connection with the other gases above enumerated.

An object of the present invention is to provide a gas mask which will afford protection against not only the ordinary type of war and occupational gas, but also against such additional gases as ammonia, hydrochloric and hydrocyanic acid fumes and carbon monoxide.

In accordance with the present invention there are employed the plant respiratory pigment chlorophylls, various derivatives of chlorophyll (both water soluble and water insoluble), namely, the chlorophyllins, the chlorophyllin salts, the porphyrins, the sulpho-derivatives of the porphyrins, metallic complexes of all these foregoing compounds and in addition all those compounds having either a phorbin or chlorin nucleus (including the purpurins) and finally includes those chemically related compounds the phthalocyanins, the imido-porphyrins, and the aza-porphins. As is now well-known, chlorophyll, the green respiratory pigment of plants, and hemoglobin the red blood cell pigment of animals are chemically related. Each has four pyrrole rings, though bound in a different way, the ring system of chlorophyll being bound to the alcohol phytol and the ring system of hemin being bound to the protein globin. Each has also a concentrically bound metal in the center of the molecule, iron in the case of hemoglobin and magnesium in the case of chlorophyll. In the case of plants, chlorophyll absorbs energy from the sun and in some unknown way uses it for the manufacture of sugar and starch from carbon dioxide and water. In the case of hemoglobin, the hemin of the hemoglobin in the circulating blood unites (in the lungs) with the oxygen of the inspired air, thus maintaining life through respiration. Because the chlorophyll pigments are thus utilized in nature as agents of gaseous interchange and union, they are of prime importance as absorbent and combining substances in a gask mask canister and have equal affinity and attraction for gases as would the blood itself.

Chlorophyllin-$a$ may be prepared following Willstaetter's method (Willstaetter, R. M. Untersuchungen Ueber Chlorophyll, J. Springer, Berlin, 1913) by alkaline cleavage of chlorophyll-$a$. It is a tri-carboxylic acid in which two of the carboxyl groups occur as in the original chlorophyll molecule, while the third one is formed by the splitting of the isocyclic ring. To make chlorophyllin water soluble the tri-sodium may be prepared.

Chlorin-e is prepared by splitting off the magnesium atom from chlorophyllin by acid treatment. However, it is more convenient to prepare it from pheophytin-a, a compound which corresponds to chlorophyll, but is magnesium free. Alkaline cleavage of pheophytin-a, following Willstaetter's process yields chlorin-e in the same way as chlorophyll, with alkaline treatment yields chlorophyllin. Here again, the trisodium salt of chlorin-e is prepared to make the compound water-soluble.

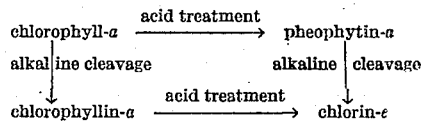

The metal complex of chlorin-e, copper chlorin-e is made and rendered water soluble in the same way as the metal-free chlorin-e. The copper atom is bound in the center of the molecule as magnesium is found in chlorophyllin.

Pyroporphyrin (typical of the chlorophyll porphyrins) is a chlorophyll porphyrin prepared by alkaline cleavage of pheophytin at higher temperatures, (usually in a pressure autoclave). It is a mono-carboxylic acid retaining the original propionic acid group of the chlorophyll molecule; it has one carbon atom in the nucleus which is saturated with hydrogen and not substituted. The water soluble derivative, pyroporphyrin sulfonic acid is prepared by sulfonation of the carbon atom with pyridinium-N-sulfonic acid according to the method of Treibs (Treibs, A. Annalen Der Chemie, 1933, 506, 196).

| Compound | Absorption spectra maxima | Sequence of intensities |
|---|---|---|
| Chlorophyllin-a trisodium salt | 639, 595, 530 | I, II, III |
| Chlorin-e tri-sodium salt | 653, 598, 543, 503 | I, IV, II, III |
| Chlorin-e, copper tri-sodium salt | 629, 585, 503 | I, III, II |
| Pyroporphyrinsulfonic acid sodium salt | 631, 575, 554, 514 | III, IV, II, I |

These compounds are readily identified in solution by their characteristic absorption spectra.

The phthalocyanines are prepared by the action of metals on the dehydration products of phthalamide (1), namely, o-cyanobenzamide (2) and phthalonitrile (3). The preparation, properties and relationship of phthalocyanines to the porphyrins is exhaustively discussed by R. P. Linstead in his paper published in Journal of Chemical Society, London, 1934, vol. 2, and 1937, vol. 1, p. 99.

All the chlorophyll substances and chlorophyll derivatives are completely described by Hans Fischer in his recently published works on the subject—Fisher-Orth "Die Chemie Des Pyrrols" Band 1 Halfte, Fisher-Orth "Die Chemic Des Pyrrols" Band 2 Halfte, edited by H. Fischer and A. Stern, Leipzig 1940, Akademische Verlagsgesellschaft, M. B. H.

In the accompanying drawing is disclosed a portion of a gas mask embodying the invention, the single figure being a sectional view of the canister. The canister consists essentially of a sheet metal casing 10 having a tube 11 leading from the top thereof and having an inlet check valve 12 in its bottom. Within the canister is supported a perforate metal tube 13 which is in direct communication with the tube 11. A perforate annular metal container 14 surrounds the tube 13 and is itself enclosed by a covering 15 of filtering material such, for example, as thick paper or felt.

In the container 14 is arranged a filling of adsorbent material consisting essentially of activated charcoal and soda lime approximately in the ratio of four to one. In the space between the inner wall of the container 14 and the tube 13 is provided a body of powdered chemical consisting of plant respirative pigment chlorophylls or its derivative or the compounds previously described.

Air enters the canister through the valve 12 and first passes through the filtering material 15, after which it enters the space within the container 14. In this container it is subjected to the action of the adsorbent material contained therein in the same manner as heretofore. From the adsorption chamber, the air passes into the space between the inner wall of the container 14 and the tube 13 where it comes in contact with the chlorophyll compound contained therein and if the air contains the gases such as ammonia, hydrochloric or hydrocyanic acid fumes or carbon monoxide, such gases are removed from the air by the chlorophyll compound after which the purified air passes out through the tube 11.

I claim:

1. In a gas mask, means for chemically removing poisonous gas from a mixture of air and such gas passing through the mask, said means comprising plant-respiratory pigment.

2. In a gas mask, means for chemically removing poisonous gas from a mixture of air and such gas passing through the mask, said means comprising chlorophyll-type plant-respiratory pigment.

3. In a gas mask, means for chemically removing poisonous gas from a mixture of air and such gas passing through the mask, said means comprising chlorophyll.

4. In a gas mask, means for chemically removing poisonous gas from a mixture of air and such gas passing through the mask, said means comprising a chemical material selected from the group consisting of chlorophyll, chlorophyll compound and chlorophyll derivative.

5. In a gas mask, means for chemically removing poisonous gas from a mixture of air and such gas passing through the mask, said means comprising a chemical material selected from the group consisting of chlorophyll, chlorophyllins, chlorophyllin salts, porphyrin and sulpho-derivatives thereof, metallic complexes of the foregoing compounds, compounds having a phorbin nucleus, compounds having a chlorin nucleus, phthalocyanins, imido-porphyrins, and azaporphins.

SYLVESTER DALY.